Oct. 19, 1954  H. C. LYONS  2,691,902
POWER TRANSMISSION ASSEMBLY
Filed Feb. 6, 1953  2 Sheets-Sheet 1

INVENTOR.
HORACE C. LYONS
BY
*McMorrow, Berman + Davidson*
ATTORNEYS

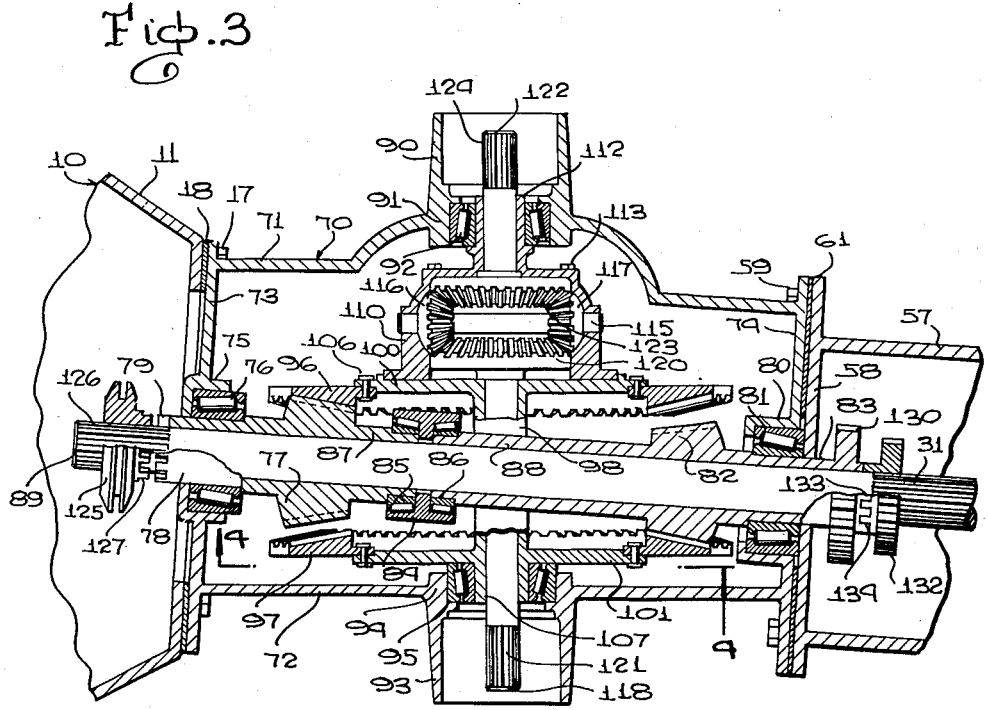
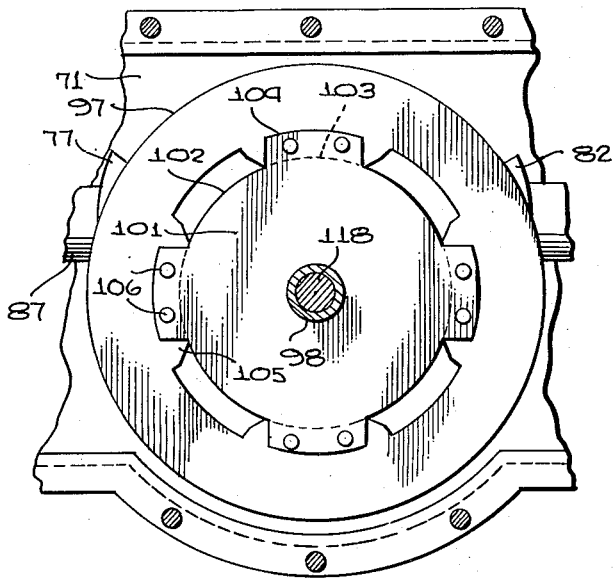

Patented Oct. 19, 1954

2,691,902

UNITED STATES PATENT OFFICE 2,691,902

POWER TRANSMISSION ASSEMBLY

Horace C. Lyons, Tucson, Ariz.

Application February 6, 1953, Serial No. 335,481

2 Claims. (Cl. 74—700)

This invention relates to power transmission assemblies and more particularly to a power transmission assembly for an engine mounted adjacent a vehicle drive axle and including a change speed gear or torque varying unit and a differential unit.

It is among the objects of the invention to provide an improved power transmission assembly in which a power plant, such as an internal combustion engine, is connected to one side of a differential unit, a change speed transmission or torque converter is connected to the differential unit opposite the power plant and a power or drive shaft extends from the power plant through the differential unit to the transmission unit or torque converter; which provides a unitary power transmission assembly in which the power plant and the change speed or torque varying unit are both rigidly connected to the differential unit, which eliminates the long drive shaft used in conventional vehicle power transmission mechanisms and provides a simplified power transmission assembly for a rear mounted vehicle engine; which facilitates the use of a two speed differential unit and provides an improved differential unit of this character; and which is simple and durable in construction, economical to manufacture, and positive and efficient in operation.

Other objects and advantages will become apparent from a consideration of the following description and the appended claims in conjunction with the accompanying drawings wherein:

Figure 3 is a longitudinal cross sectional view, similar to Figure 2, of a somewhat modified form of power transmission assembly; and Figure 4 is a fragmentary cross sectional view on the line 4—4 of Figure 3.

Figure 1:
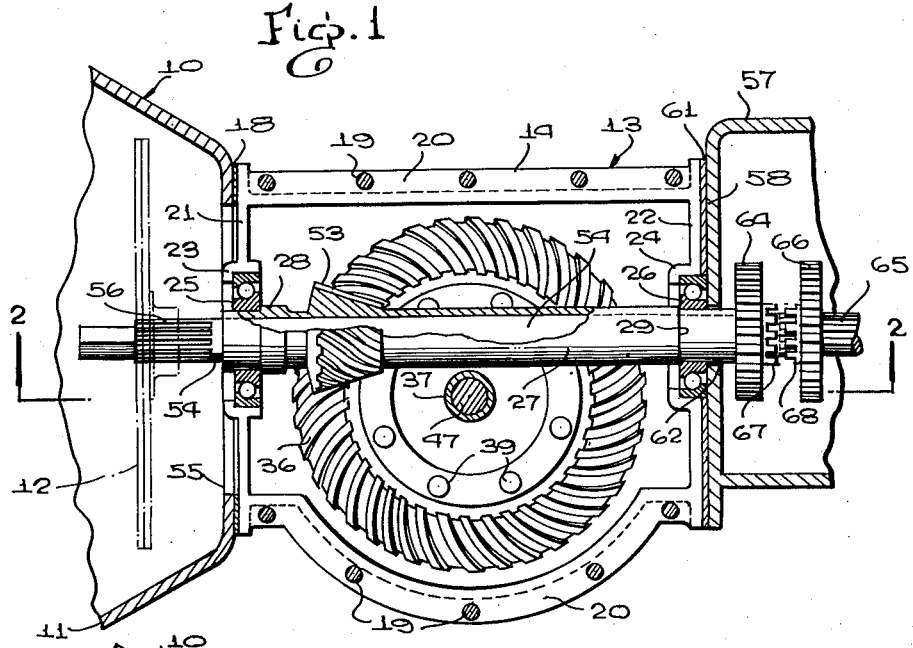
Figure 1 is a longitudinal cross sectional view through a power transmission assembly illustrative of the invention.
Figure 2:
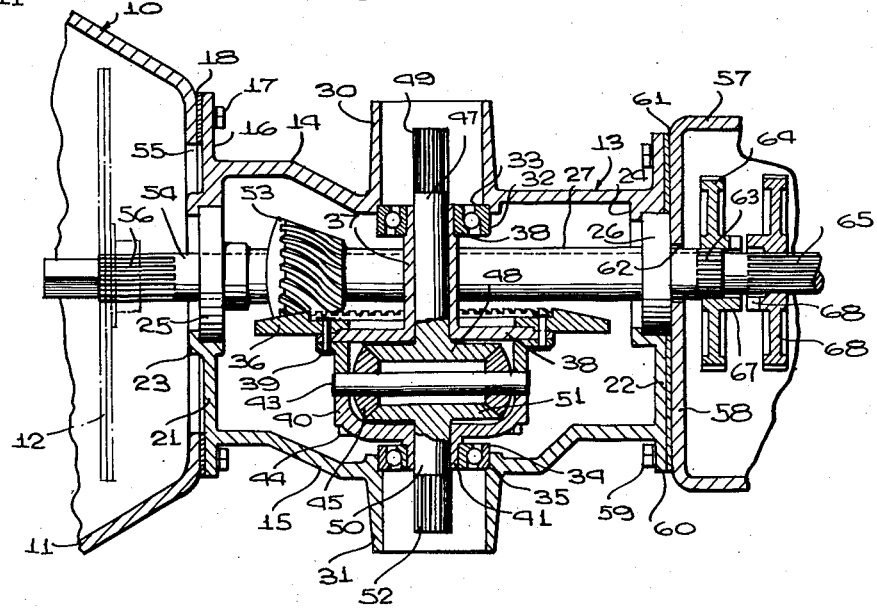
Figure 2 is a longitudinal cross sectional view on the line 2—2 of Figure 1.

With continued reference to the drawings and particularly to Figures 1 and 2, the numeral 10 generally designates a power plant, such as an internal combustion engine, having at one end a housing 11 which may constitue the clutch housing of such an engine. A friction clutch 12 is diagrammatically illustrated and is drivenly connected to the engine crank shaft in the usual manner. It is to be understood, however, that some other form of power transmitting mechanism, such as a fluid coupling, may be substituted for the friction clutch 12 without in any way exceeding the scope of the invention.

A differential unit, generally indicated at 13, and including a housing provided in two parts 14 and 15, is disposed adjacent the end of the engine housing 11 and the differential unit housing is rigidly secured to the engine housing. In the arrangement illustrated, the parts of the differential housing are provided with complementary formations providing a flange 16 which overlies the end of the engine housing 11 and is secured to the latter by suitable means, such as the bolts or cap screws 17, extending through corresponding apertures in the flange 16 and threaded into corresponding tapped holes in the engine housing. A gasket 18 is interposed between the flange 16 and the adjacent surface of the engine housing to provide a lubricant tight seal between the engine housing and the housing of the differential unit.

The two parts 14 and 15 of the differential housing are separable along a plane extending from one end of this housing to the other end and are rigidly secured together by suitable means, such as the bolts 19 extending through registering apertures in complementary flanges 20 extending along the edges of the two parts of the differential housing.

At its opposite ends with the differential housing is provided with end walls 21 and 22 and these end walls are formed to provide annular bearing receptacles 23 and 24 respectively. An antifriction bearing 25 is mounted in the receptacle 23 and a similar antifriction bearing 26 is mounted in the receptacle 24. A tubular quill shaft 27 is journaled near its respectively opposite ends in the bearings 25 and 26 and this quill shaft has annular formations 28 and 29 thereon providing shoulders which respectively engage the inner races of the bearings 25 and 26 to hold the quill shaft against longitudinal movement relative to these bearings and to also hold the bearings in the corresponding receptacles 23 and 24.

The two parts 14 and 15 of the differential housing are provided respectively with outwardly projecting hollow bosses 30 and 31 to which the inner ends of tubular axle shaft housings are respectively connected and each of these bosses is annularly recessed at its inner end to provide a seat or receptacle for an antifriction bearing. An antifriction bearing 32 is mounted in the seat 33 provided in the boss 30 and a similar antifriction bearing 34 is mounted in the seat 35 provided in the boss 31.

A ring gear 36 is disposed in the differential housing and a tubular hub 37 projects coaxially from one side of the ring gear and is received at its end remote from the ring gear in the antifriction bearing 32, and at its other end this hub has an annular flange formation 38 which bears marginally against the side of the ring gear remote from the bearing 32.

A cup shaped spider gear housing 40 is disposed at its open end against the side of the flange formation 38 remote from the ring gear 36 and has at its end remote from the ring gear a hollow hub 41 received in the inner race of the bearing 34 and provided with an annular shoulder 42 which bears against the inner race of this bearing to maintain the bearing seated in the seat formation 35. The ring gear 36, the hub 37 and the spider gear housing 40 are rigidly connected together by the rivets 39 and provide a unitary structure extending transversely of the transmission housing and journaled at its opposite ends in the bearings 32 and 34.

The housing 40 is made in two separable parts, both of which are provided with semicircular notches in their mutually opposed edges which notches constitute bearing apertures in the housing when the two parts are secured together in operative assemby and the part nearest the ring gear has at its end disposed against the flange formation 38 on the hub 37 an external annular flange 44, through which the rivets 39 extend. A spider gear axle 43 is mounted near its respectively opposite ends in the apertures thus provided in the spider gear housing. The two parts of the housing are secured together by suitable means, such as the cap screws 44 which may extend through the outer part of the housing and be threaded into tapped holes provided in the inner part of the housing to secure the two parts of the housing together.

Spider gears 45 and 46 are journaled on the axle 43 within the housing 40 and near the respectively opposite ends of the axle. An axle coupling pin 47 extends through and is journaled in the tubular hub 37 and carries on its end within the housing 40 a differential gear 48 which meshes with the two spider gears 45 and 46. The other end of this axle coupling pin is disposed within the boss 30 and provided with a spline formation 49 for connecting the coupling pin to an axle shaft or corresponding driven element.

A second axle coupling pin 50 extends through and is journaled in the hollow hub 41 of the housing 40 and carries on its end within the housing a differential gear 51 which also meshes with the spider gears 45 and 46. The other end of this second coupling pin is disposed within the boss 31 and provided with a spline formation 52 for connecting this coupling pin to a corresponding axle shaft or equivalent driven element.

A pinion gear 53 is provided on the quill shaft 27 near the bearing 25 and meshes with the ring gear 36 to drive the differential mechanism when the quill shaft is driven.

It is to be understood that the differential mechanism is somewhat diagrammatically illustrated and described and may be structurally modified without in any way exceeding the scope of the invention. For example, while only two spider gears are illustrated and described, it is to be understood that three or more spider gears may be utilized if considered advisable.

The quill shaft 27 preferably extends through the differential unit above the ring gear hub 37 so that the rotational axis of the pinion gear 53 does not intersect the rotational axis of the ring gear. The gears 36 and 53 are, therefore, hypoid gears with the pinion gear above a substantially horizontal plane including the axis of rotation of the ring gear. This permits a higher mounting for the rear mounted engine, giving greater road clearance for the vehicle and more efficient operation.

A drive shaft 54 extends through and is journaled in the tubular quill shaft 27 and projects at one end into the engine housing 11 through an aperture 55 in the end of this housing. This drive shaft is provided within the housing 11 with a spline formation 56 by means of which it is drivenly connected to the vehicle clutch 12 or equivalent power delivery mechanism.

A change speed gear or transmission housing 57 is disposed at the end of the differential mechanism opposite the engine housing 11 and has an end wall 58 disposed against the adjacent end wall 22 of the differential housing. The transmission housing is rigidly secured to the differential housing by suitable means, such as the cap screws 59, extending through corresponding apertures in an annular flange 60 on this end of the differential housing and threaded into corresponding tapped holes in the end wall 58 of the transmission housing. A gasket 61 is interposed between the end wall 22 of the differential housing and the end wall 58 of the transmission housing to provide a lubricant tight seal between these two housings and the drive shaft 54 projects through an aperture 62 in the end wall 58 and into the transmission housing.

Where a change speed gear transmission, as indicated in the accompanying drawings, is utilized, the quill shaft 27 is provided within the transmission housing 57 with a spline formation 63 and a transmission gear 64 is mounted on this spline formation and will mesh with a gear of the usual cluster gear, not illustrated, for driving the quill shaft at various speed ratios.

The drive shaft 54 is provided adjacent the end of the quill shaft within the transmission housing 57 with a spline formation 65 and a gear 66 is slidably mounted on this spline formation and will cooperate with the above mentioned cluster gear to provide one of the transmission speed ratios. The gears 64 and 66 are provided on their mutually adjacent faces with clutch formations 67 and 68 respectively which can be engaged by sliding the gear 66 along the spline formation 65 of the drive shaft toward the gear 64 to provide a direct drive from the drive shaft 54 to the quill shaft 27.

While a change speed gear transmission has been diagrammatically illustrated and described above, it is to be understood that the invention is not limited to this particular type of torque varying mechanism, but that a hydraulic torque converter, an automatic transmission, or other torque varying mechanisms may be utilized without in any way exceeding the scope of the invention to drivingly connect the drive shaft 54 to the quill shaft 27 and provide the necessary torque variation for operation of the vehicle.

The modified arrangement illustrated in Figures 3 and 4 may utilize the same power plant and the same torque varying unit, but includes a two speed differential mechanism. In this arrangement, the differential unit, generally indicated at 70, has a housing provided in two separable parts 71 and 72 secured together in the same manner as the two parts of the housing 13, illustrated in Figures 1 and 2 and described above, and providing end walls 73 and 74 of which the end wall 73 is disposed against the end of the engine housing 11 and secured thereto by the cap screws 17 with the gasket 18 interposed between the housing 11 and the end of the differential unit housing to provide a lubricant tight seal between these housings. The end wall 74 of the differential housing is disposed against the corresponding end wall 58 of the transmission housing unit 57 and secured thereto by the bolts 59, a gasket 61 being interposed between these two end walls to provide a lubricant tight seal.

The end wall 73 is provided with an annular bearing receptacle 75 receiving an antifriction bearing 76 and a pinion gear 77 has a tubular hub 78 extending through and journaled in the bearing 76, the end of the hub 78 remote from the gear 77 being provided with dog clutch teeth 79.

The end wall 74 of the differential housing is provided with an annular bearing receptacle 80 and an antifriction bearing 81 is mounted in this receptacle. A pinion gear 82, smaller than the pinion gear 77, is disposed within the differential unit housing and has projecting from one end a tubular hub 83 which extends through and is journaled in the bearing 81.

A bearing support or receptacle 84 extends inwardly of the wall of the differential unit housing and carries two spaced apart antifriction bearings 85 and 86. The pinion gear 77 is provided at its end remote from the hub 78 with a tubular hub formation 87 received in the bearing 85 and the pinion gear 82 is provided at its end remote from the hub 83 with a tubular hub 88, the end of which remote from the pinion gear 82 is received in the bearing 86. The two pinion gears 77 and 82 and their hubs extend longitudinally of the differential unit housing from one end to the other of this housing and through the opposite end walls thereof and have a common axis of rotation.

A drive shaft 89 extends through and is journaled in the two pinion gears 77 and 82 and extends at its opposite ends beyond the distal ends of the hub formation 78 and 83.

The differential unit housing part 71 is provided with an outwardly projecting hollow boss 90 having at its inner end a bearing seat formation 91 and an antifriction bearing 92 is seated in the bearing seat 91. The housing part 72 is provided with an outwardly projecting hollow boss 93 provided at its inner end with a bearing seat formation 94 and an antifriction bearing 95 is mounted in the seat 94. The bosses 90 and 93 receive the inner ends of tubular axle shaft housings or equivalent structural elements, not illustrated.

Two ring gears 96 and 97 are disposed in the differential unit housing in spaced apart and substantially parallel relationship to each other and are connected together by a common, tubular hub 98 extending therebetween. The hub 98 is provided with spaced apart annular flanges 100 and 101 disposed at the outer sides of the ring gears 96 and 97 respectively, and marginally overlying the ring gears. The flanges 100 and 101 are provided with angularly spaced apart peripheral notches, as indicated at 102 for the flange 101, providing therebetween angularly spaced apart, apertured lugs, as indicated at 103, and the ring gears are provided in their inner edges with spaced apart notches, as indicated at 104 for the ring gear 97, providing therebetween angularly spaced apart apertured lugs as indicated at 105, which pass through the notches in the corresponding hub flanges as the ring gears are being assembled with the hub, the hub flange lugs also passing through the notches in the corresponding ring gears. After the hub flanges have been passed through the corresponding ring gears, the gears are rotated relative to the flanges until the corresponding lugs are superposed and the lugs are secured together by the rivets 106. At one end the hub 98 has a hub formation 107 projecting outwardly and received in the antifriction bearing 95.

A cup shaped spider gear housing 110 is secured at its open end to the hub flange 100 at the side of this flange remote from the ring gears 96 and 97 and the housing 110 has at its end remote from the ring gear 96 a hollow hub 112 received in the antifriction bearing 92 to support the housing 110 on the differential unit housing part 71.

The housing 110 is provided in two separable parts which are connected together and secured to the hub flange 100 by suitable cap screws 113 and the two parts of this housing are provided with notches which are aligned where the two parts are secured together to provide apertures receiving respectively opposite ends of a spider gear axle 115. Spider gears 116 and 117 are journaled on the axle 115 and disposed within the housing 110, one near each end of the axle, and a coupling pin 118 extends through the hub 98 into the housing 110 and carries on its end within the housing 110 a differential gear 120 which meshes with the spider gears 116 and 117. The coupling pin 118 projects at its other end into the boss 93 and is there provided with a spline formation 121 for connecting this coupling pin to an axle shaft or equivalent driven member.

A second coupling pin 122 extends through the hub 112 on the housing 110 into this housing and is provided at its end within the housing 110 with a differential gear 123 meshing with the spider gears. This second coupling pin extends into the boss 90 and is provided at its end within this boss with a spline formation 124 for connecting this second coupling pin to an axle shaft or equivalent driven element.

The pinion gear 77 meshes with the ring gear 96 and the pinion gear 82 meshes with the ring gear 97, the gear ratio between the pinion 77 and ring gear 96 being less than the ratio between the pinion 82 and the ring gear 97 so that the transmission unit will have two speeds depending upon which of the pinion gears is transmitting power to the associated ring gear.

In order that each pinion gear may mesh with its associated ring gear without interfering with the other ring gear, the rotational axis of the pinion gears 77 and 82 and of the drive shaft 89 is shown as slightly inclined relative to the rotational axis of the two ring gears 96 and 97 and the differential mechanism. In the arrangement illustrated, the angle between the two axes of rotation is between 85 and 90 degrees, but it is contemplated that the two axes may be disposed substantially at right angles to each other, if desired, by properly designing the ring gears and pinion gears for this purpose.

It is contemplated that in the arrangement illustrated, the pinion gear 77 and ring gear 96 will constitute an overdrive or high speed drive for the vehicle and that only a releasable direct driving connection between the pinion gear 77 and the drive shaft 89 will be required. Such a direct driving connection is provided by a dog clutch element 125 slidably mounted on the splined end portion 126 of the drive shaft 89 within the engine housing 11, the clutch element 125 being provided with clutch teeth 127 which engage with the clutch teeth 79 on the adjacent end of the pinion gear hub 78 to provide a direct driving connection between the drive shaft 89 and the pinion gear 77. Suitable means, not illustrated, are provided for moving the clutch element 125 and this control means is so coordinated with the change speed transmission or torque varying mechanism that the two pinion gears 77 and 82 cannot be connected to the drive shaft 89 at the same time.

A transmission gear 130 is provided on the end of the pinion gear hub 83 projecting into the transmission housing 57 and the drive shaft 89 is provided within the transmission housing with a spline formation 131.

A shiftable transmission gear 132 is slidably mounted on the spline formation 131 of the drive shaft 89 and the gears 130 and 132 are provided on their mutually adjacent sides with clutch teeth 133 and 134 respectively which intermesh when the gear 132 is moved toward the gear 130 to provide a direct driving connection between the drive shaft 89 and pinion gear 82.

The change speed gear transmission illustrated will include the usual cluster gear, not illustrated, driven by the drive shaft 131 at various selected speed ratios and driving the pinion gear 82 through the gear 130. It is to be understood, however, that other forms of torque varying devices may be used in substitution of the change speed gear transmission, if desired.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. In combination with a power plant and a torque varying unit, a differential unit comprising a housing having oppositely disposed ends secured one to said power plant and the other to said torque varying unit, antifriction bearings mounted one in each end of said housing, antifriction bearings mounted in said housing between the ends thereof, a first pinion gear journaled at one end in the bearing in the power plant connected end of said housing and journaled at its other end in a bearing between the ends of said housing, a second pinion gear journaled at one end in the bearing in the end of said housing adjacent said torque varying unit and journaled at its other end in a bearing between the ends of said housing, said pinion gears having mutually aligned bores therethrough, a drive shaft extending through said pinion gears drivingly connecting said power plant to said torque varying unit, clutch means acting between said drive shaft and said first pinion gear for drivingly connecting the latter to said drive shaft, means drivingly connecting said torque varying unit to said second pinion gear, interconnected ring gears disposed in said housing and meshing respectively with said pinion gears, differential mechanism secured to said ring gears, and means journaling said ring gear and differential mechanism assembly in said housing, said pinion gears and associated ring gears providing different gear ratios.

2. In combination with a power plant and a torque varying unit, a differential unit comprising a drive shaft extending between and drivingly connecting said power plant to said torque varying unit, a first pinion gear mounted on said shaft for rotation therearound adjacent said power plant, a second pinion gear mounted on said shaft for rotation therearound adjacent said torque varying unit, interconnected ring gears meshing respectively with said pinion gears, a differential mechanism secured to said ring gears, clutch means acting between said drive shaft and one of said pinion gears for drivingly connecting the latter to said drive shaft, and another clutch means acting between said drive shaft and the other of said pinion gears for drivingly connecting the latter to said drive shaft, said pinion gears and associated ring gears providing different gear ratios.

References Cited in the file of this patent

UNITED STATES PATENTS

| Number | Name | Date |
|---|---|---|
| 1,864,992 | Fatland | June 28, 1932 |
| 1,938,201 | Wells | Dec. 5, 1933 |
| 2,000,605 | Moorehouse | May 7, 1935 |
| 2,075,084 | Best | Mar. 30, 1937 |
| 2,105,742 | Lee | Jan. 18, 1938 |
| 2,110,021 | Kliesroth | Mar. 1, 1938 |